Aug. 8, 1961 J. H. RISEBOROUGH 2,995,399
TILTABLE TRAILER WITH RAMP MEANS
Filed April 1, 1955 5 Sheets-Sheet 1
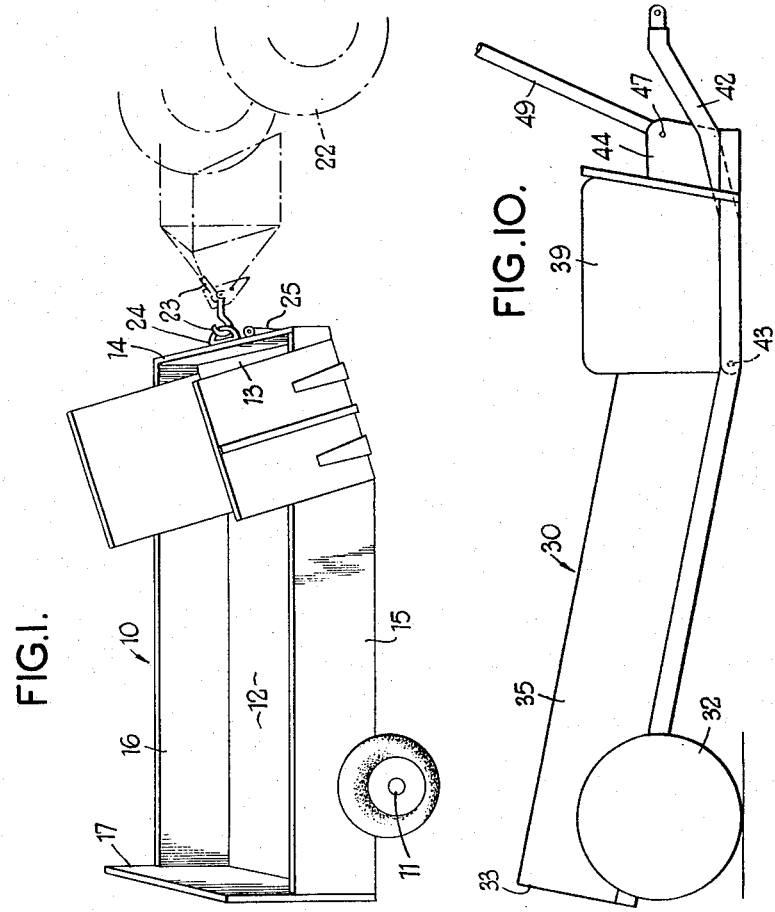
Inventor
John H. Riseborough
by Malcolm W. Fraser
attorney Aug. 8, 1961  J. H. RISEBOROUGH  2,995,399
TILTABLE TRAILER WITH RAMP MEANS
Filed April 1, 1955  5 Sheets-Sheet 2
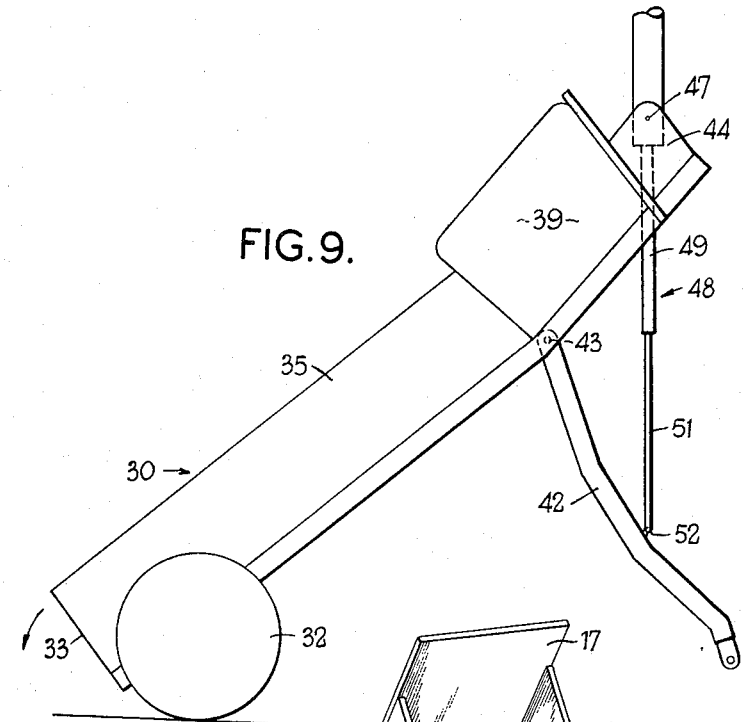
FIG. 9.
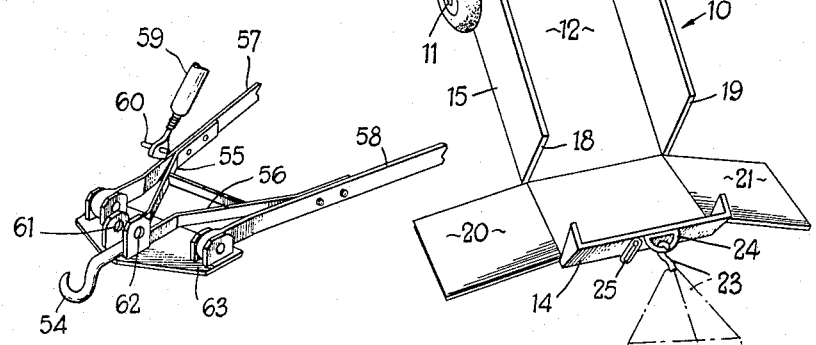
FIG.II.  FIG.2
Inventor
John H. Riseborough
by Malcolm W. Fraser
attorney Aug. 8, 1961     J. H. RISEBOROUGH     2,995,399
TILTABLE TRAILER WITH RAMP MEANS
Filed April 1, 1955     5 Sheets-Sheet 3
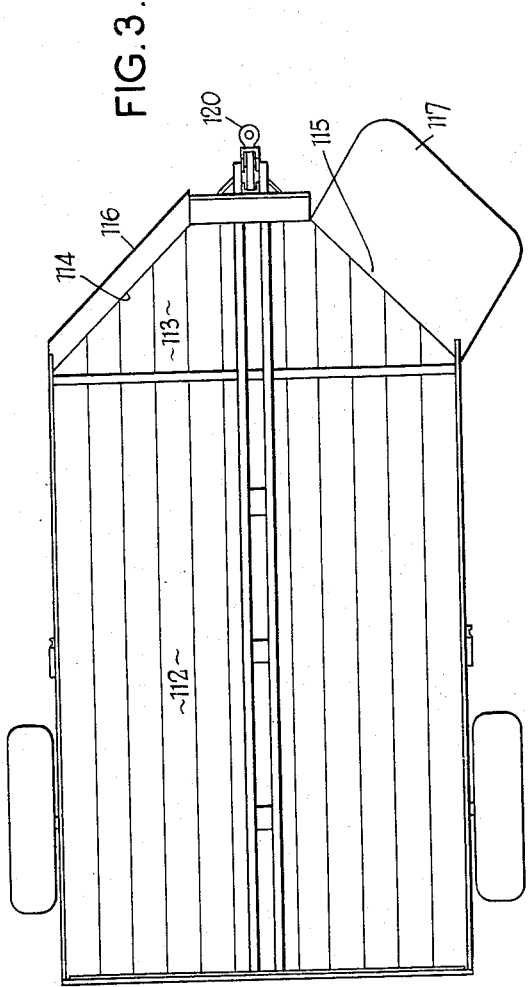
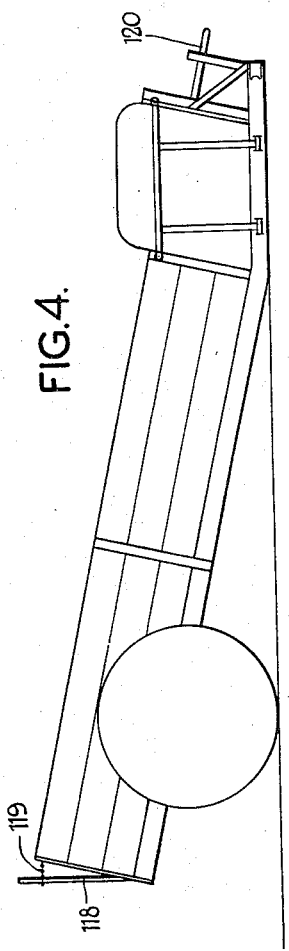

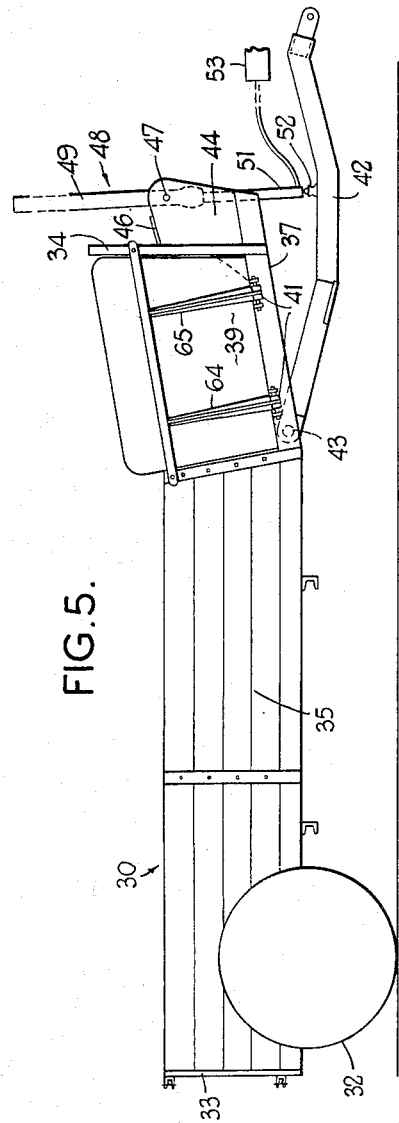
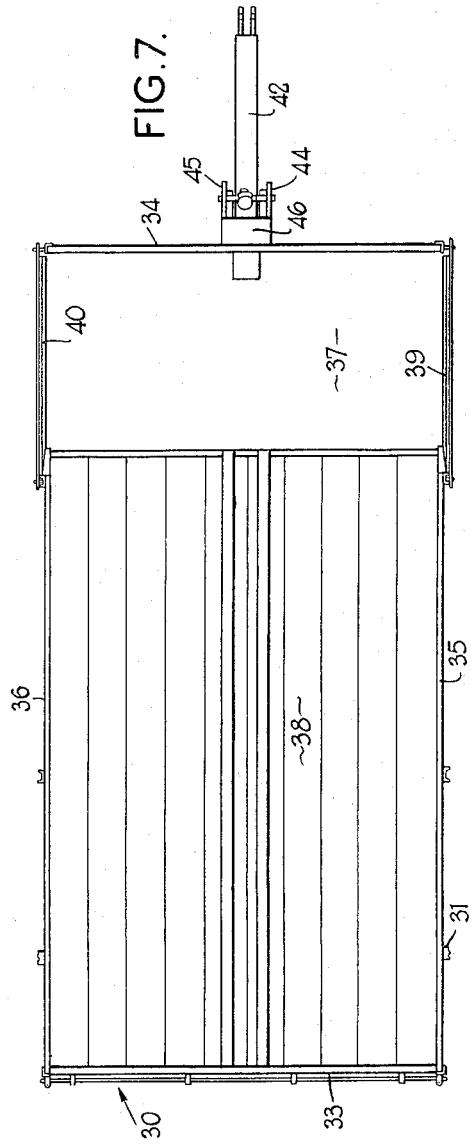

Aug. 8, 1961   J. H. RISEBOROUGH   2,995,399
TILTABLE TRAILER WITH RAMP MEANS
Filed April 1, 1955   5 Sheets-Sheet 5
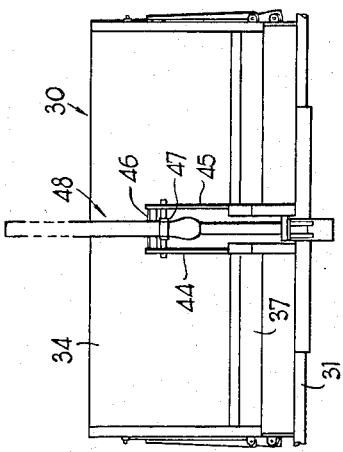
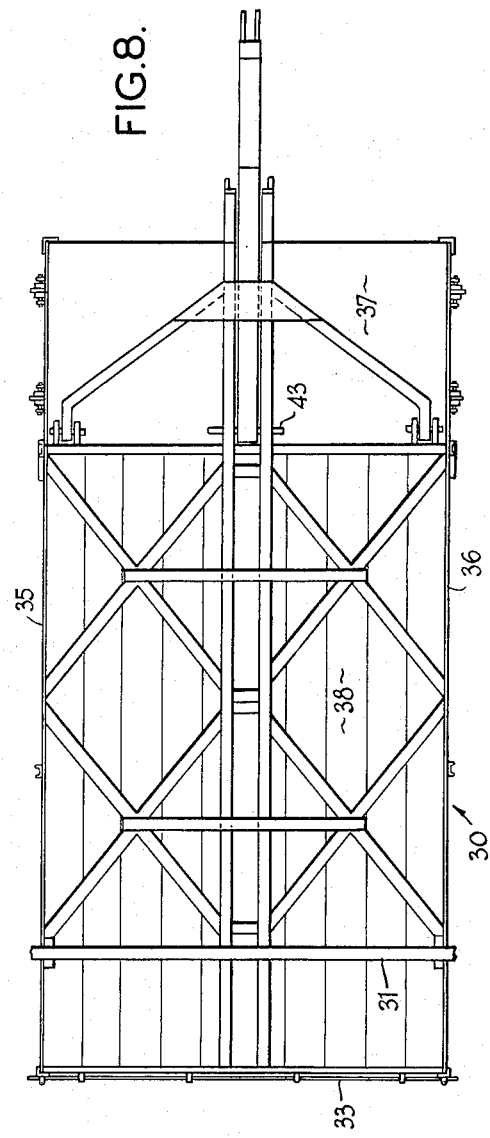

United States Patent Office 2,995,399
Patented Aug. 8, 1961

2,995,399
TILTABLE TRAILER WITH RAMP MEANS
John Henry Riseborough, No. 5, The Common,
Freethorpe, Norwich, England
Filed Apr. 1, 1955, Ser. No. 498,690
Claims priority, application Great Britain Apr. 12, 1954
2 Claims. (Cl. 296—28)

The present invention relates to an improved trailer of the type having wheeled support such that the forward end of the trailer may be raised and lowered, said forward end being adapted to be supported by a towing vehicle or tractor.

At the present time it is common practice to haul a two-wheeled trailer with the aid of a tractor fitted with a fixed drawbar on the tractor or, occasionally, with the aid of a drawbar on the trailer attached to three-point lifting linkage on the tractor.

With such lifting mechanism the towing point can be raised and lowered to lift up the front end of the trailer or to lower the front end to the ground.

It is an object of this invention to provide a trailer with the aid of which loads may be hand-trucked from the ground on to the trailer floor.

Preferred forms of the invention will now be described with reference to the accompanying diagrammatic drawings, in which:

FIGURES 1 and 2 are perspective views from above of a simple form of trailer constructed in accordance with the invention, FIGURES 3 and 4 are a plan and elevation respectively of a modified trailer, FIGURES 5 and 6 are respectively a side and front elevation of another trailer, FIGURES 7 and 8 are respectively a plan and underplan of the trailer of FIGURES 5 and 6, FIGURES 9 and 10 show schematically the tipping and ground-level loading positions of the trailer of FIGURES 5 to 8, and FIGURE 11 is a perspective view of a towing hook.

The simple form of trailer illustrated in FIGURES 1 and 2 is shown in its raised position for towing in FIGURE 1 and in its lowered, ground-level-loading position in FIGURE 2.

The trailer comprises a body 10 mounted in the normal way on a single axle 11 placed towards the rear of the body so that the forward end may be raised and lowered by pivoting on the axle.

The floor of the trailer is in two parts, namely a reardeck 12 which, when the trailer is in the towing position, is approximately horizontal, and a foredeck 13 which slopes upwardly and forwardly with respect to the reardeck at an angle such that when the front end of the trailer is lowered to the ground the foredeck lies approximately flat on the ground.

As illustrated in FIGURES 1 and 2 front wall 14 of the trailer is shorter than the side walls 15 and 16, whilst the tail wall 17 is taller than the side walls and is hinged at its lower end to the reardeck 12.

Gaps 18 and 19 are formed at the front ends of the side walls to receive flapdoors 20 and 21, respectively, which are similar, each being hinged at its lower end to a longitudinal edge of the foredeck 13.

The arrangement is such that when the front end of the trailer is lowered to the ground, into the position shown in FIGURE 2, the foredeck and both doors (when open) all lie approximately flat on the ground.

At 22 in FIGURES 1 and 2 is shown a portion of a tractor fitted with a towing hook 23 secured to the lower arms of a three-point linkage system, operated hydraulically from the tractor. Drawbar mechanism of this type are fitted to various well known tractors.

The towing hook fits into a towing eye 24 on the front wall 14 of the trailer and with its aid the towing point can be raised and lowered. Alternatively, one or a pair of manually operable jacks such as that shown at 25 may be fitted to the front end of the trailer for raising and lowering it.

When the trailer is lowered and a door opened, heavy loads, such as sacks of corn weighing as much as eighteen stone, may be trucked by one man on to a door and thence on to the foredeck of the trailer. Then the same man can raise the trailer by operation of either the jack or the linkage system on the tractor, if necessary by remote control, whereupon the reardeck returns to the level and the man can then truck the load from the foredeck to the reardeck of the trailer and either secure it, as by chain or rope, or stack it against an outwardly leaning door.

In order to pick up the next load the tractor is stopped, the jack or three-point linkage lowered, a trailer door opened and the next load trucked on to the trailer in the manner described above.

In this way one man can transport corn from a field sacked by a combine harvester where, hitherto, two or even three have been required to lift the heavy sacks.

The trailer illustrated in FIGURES 3 and 4 is generally similar to that of FIGURES 1 and 2 except that the front corners of the trailer have been cut off in order to provide more room for the wheels of a tractor or other towing vehicle. As before the trailer comprises a reardeck 112 and a foredeck 113 which slopes upwardly and forewardly with respect to the reardeck.

The rectangular corners of the foredeck are removed so that the deck has oblique edges 114 and 115 on which are hinged upright doors 116 and 117. Assuming a door of, say, 3' width is required to give adequate clearance for loading and unloading, the foredeck 113 of this trailer can be made a little shorter in the longitudinal direction than the foredeck 13 of FIGURES 1 and 2, because the widths of the doors 116 and 117 are on the diagonals of the cut-away triangles at the front of this trailer.

As shown in this figure the rear wall 118 is secured by a chain 119 to the side walls in order that the rear wall may be sloped backwardly and upwardly so that sacks can be leaned against it in that position.

The trailer is provided with a towing eye 120.

The trailer illustrated in FIGURES 5 to 10 inclusive is generally similar to that of FIGURES 1 and 2, but is provided with improved raising and lowering mechanism. It comprises a body 30 mounted on an axle 31 carrying a pair of wheels one of which is shown at 32.

The body has an openable tail wall 33, a front wall 34 the whole or a part of which may be removed, side walls 35 and 36 and a two-part floor consisting of fore- and reardecks 37 and 38, respectively, relatively inclined as in the case of FIGURES 1 and 2.

The side walls 35 and 36 are fitted with doors 39 and 40, respectively, each hinged, as at 41 (FIGURE 5), to a longitudinal edge of the foredeck 37.

The trailer may be hitched to a tractor or other vehicle with the aid of a drawbar 42 which is bent downwardly and is pivoted at its rear end to a pin 43 fixed on the trailer (see FIGURE 8). The drawbar is coupled to a vehicle with the aid of a universal joint.

The chassis 37 of the trailer is provided with a pair of steel plates 44 and 45, braced at 46, between which is pivotally mounted, as at 47, the body of a hydraulic jack indicated generally at 48. The jack illustrated comprises an inner member 51 pivotally mounted as at 52 on the upper face of the drawbar 42.

The jack is preferably operated from a prime mover 53 on the vehicle serving to tow the trailer.

In operation, when fluid is withdrawn from the jack, it telescopes inwardly to the position shown in FIGURE 10 so that its overall length is a minimum and the front end of the trailer is lowered to the ground. On pumping a little fluid into the jack the latter extends a little to lift the front end of the trailer to the towing position shown in FIGURE 5. On fully extending the jack, it opens to its maximum length shown in FIGURE 9 and serves to raise the front end of the trailer to maximum height where goods can be tipped or lifted out of the rear end of the trailer.

A manually operable jack may be used in place of the hydraulic power-operated one described, in which case means may be provided for locking the jack in each of the three positions described.

The front wall 34 of the trailer is made removable so that a loaded sack can be dragged on to the foredeck when the latter is at ground-level, then the jack is operated to raise the foredeck to a height such that the sack can be taken off at shoulder level.

In FIGURE 11 is illustrated a tow hook 54 rigid with a pair of braced arms 55 and 56 riveted or welded to the lifting arms 57 and 58 respectively of a three-point linkage system normally used on tractors. The third arm of the linkage system is shown at 59 and is provided at its end with a pin 60 which in use is passed through eyes 61 and 62 mounted on a hook plate 63. When the member 59 is removed from the hook the lifting arms 57 and 58 may be operated in the usual way to raise and lower the hook and thus the trailer coupled to it. When the arm 59 is secured in the eyes 61 and 62 the three-point linkage becomes solid and the weight of the trailer is thus taken off the hydraulic mechanism.

As illustrated in FIGURES 5 and 6 it will be seen that each door is provided with strengthening ribs such as those shown at 64 and 65 which taper upwardly giving the result that when the doors are open they lie on the ground in the form of a gently sloping ramp.

Preferably remote control means are provided whereby the lifting and lowering of the trailer may be effected, by an operation on or near the trailer, using power supplied by the tractor.

What I claim is:

1. A trailer comprising a frame, a pair of coaxial road wheels mounted on the underside of the rear of said frame and about the axis of which the frame can pivot, a floor on said frame, a rear deck forming part of the floor which rear deck is approximately horizontal when the trailer is in towing position, a foredeck also forming part of the floor sloping upwardly and forwardly from the rear deck so as to be approximately horizontal when the trailer is lowered, pivoting on the axis of its road wheels, so that the front end of the trailer rests on the ground, side walls at least one of which has an aperture therein at the front end of the trailer giving access directly to the foredeck, a draw bar bent so as to be concave in plan view and pivotally mounted on the trailer by its rear end so as to be pivotable in a vertical plane, and a jack comprising relatively longitudinally movable parts pivotally connected so as to be pivotable in said vertical plane, respectively to the draw bar at a point within its concavity and to the forward end of the trailer, the arrangement being such that when the said parts of the jack are relatively longitudinally moved, angular movement in said vertical plane is induced between the draw bar and the trailer.

2. A trailer comprising a frame, a floor mounted on said frame, said floor having a first section and a second section, the floor of said first section being disposed in substantially parallel relation with the ground when said trailer is in towing position, the floor of said second section having an extended substantially planar surface to provide a ramp the width of which is not substantially less than the width of said first section adjacent the mating edges of said first and second sections, said second section forming an obtuse angle with said first section, said obtuse angle being so selected that the plane of the floor of said second section is in parallel relation to and in engagement with the ground when said trailer is tilted, axle means carried by said frame beneath the floor of the first section, ground-engaging wheel means mounted to the said axle means, and side walls, at least one of said side walls being provided with an aperture therein in the zone of the second section of said floor thereby providing access directly from the ground to said second floor section when said trailer is tilted.

References Cited in the file of this patent

UNITED STATES PATENTS

| | | |
|---|---|---|
| 1,035,440 | Holcomb | Aug. 13, 1912 |
| 1,291,145 | Reno | Jan. 14, 1919 |
| 2,115,640 | Levin | Apr. 26, 1938 |
| 2,135,857 | Stahl | Nov. 8, 1938 |
| 2,606,376 | Mork | Aug. 12, 1952 |
| 2,628,126 | Black | Feb. 10, 1953 |
| 2,654,613 | Blair | Oct. 6, 1953 |

FOREIGN PATENTS

| | | |
|---|---|---|
| 720,526 | France | July 23, 1931 |